(12) United States Patent
Schulz

(10) Patent No.: US 7,299,731 B2
(45) Date of Patent: Nov. 27, 2007

(54) PAPER TRIMMER

(75) Inventor: William J. Schulz, Mosinee, WI (US)

(73) Assignee: Alterra Holdings Corporation, Tigard, OR (US)

( * ) Notice: Subject to any disclaimer, the term of this patent is extended or adjusted under 35 U.S.C. 154(b) by 902 days.

(21) Appl. No.: 10/057,850

(22) Filed: Jan. 25, 2002

(65) Prior Publication Data

US 2003/0140761 A1   Jul. 31, 2003

(51) Int. Cl.
*B26D 7/02* (2006.01)
*B26D 1/04* (2006.01)

(52) U.S. Cl. ............................. 83/614; 83/455; 83/564

(58) Field of Classification Search .................. 83/614, 83/455, 175, 564, 485, 578, 454
See application file for complete search history.

(56) References Cited

U.S. PATENT DOCUMENTS

| | | | | |
|---|---|---|---|---|
| 1,497,765 A * | 6/1924 | Abbott, Jr. | | 83/251 |
| 2,327,223 A | 8/1943 | Silver | | 164/77 |
| 2,753,938 A | 7/1956 | Thiess | | 164/73 |
| 2,823,969 A * | 2/1958 | Traver et al. | | 83/454 |
| 3,108,349 A * | 10/1963 | Takacs | | 83/437.1 |
| 3,227,016 A | 1/1966 | Moeller | | 83/11 |
| 3,237,497 A | 3/1966 | Cook | | 83/387 |
| 3,301,117 A | 1/1967 | Spaulding | | 83/455 |
| 3,385,149 A * | 5/1968 | Johnson | | 83/175 |
| 3,704,908 A * | 12/1972 | Schwartz | | 292/264 |
| 3,779,119 A | 12/1973 | Broides | | 83/581 |
| 3,821,915 A | 7/1974 | Larrable | | 83/174 |
| 4,245,536 A * | 1/1981 | Urion | | 83/821 |
| 4,408,789 A * | 10/1983 | Miller | | 292/268 |
| 4,516,452 A | 5/1985 | Dahle | | 83/455 |
| 4,662,258 A | 5/1987 | Mood | | 83/455 |
| 4,686,879 A | 8/1987 | Ito et al. | | 84/440 |
| 4,787,284 A * | 11/1988 | Chen | | 83/614 |

(Continued)

FOREIGN PATENT DOCUMENTS

GB     2 223 976 A     4/1990

OTHER PUBLICATIONS

DC—Personal Ruler Trimmer, Carl Brands, www.carl-products.com.

(Continued)

*Primary Examiner*—Boyer D. Ashley
*Assistant Examiner*—Carolyn T Blake
(74) *Attorney, Agent, or Firm*—Foley & Lardner LLP

(57) ABSTRACT

A material trimmer including a base having a support surface and a cutting region having a channel. A plate is movably attached to the base and includes oppositely facing upper and lower surfaces, an elongated slot therethrough, an elevated portion proximate each side of the slot, and a distal second end with the elevated portion leading to an arcuate surface. A carrier includes a top flange having a pair of oppositely extending sides and a foot extending from the top flange. The foot is slidably received within the slot, and a portion of the pair of oppositely extending sides are arcuate in shape and slidably received within the arcuate surface of the elevated portion. A blade is attached to the carrier, a portion of which extends below the lower surface of the plate within the channel when the plate is disposed over the cutting region.

18 Claims, 8 Drawing Sheets

U.S. PATENT DOCUMENTS

| | | | |
|---|---|---|---|
| 4,967,628 A * | 11/1990 | Judd et al. | 83/614 X |
| 5,036,740 A * | 8/1991 | Tsai | 83/614 X |
| D321,368 S | 11/1991 | Beno et al. | D18/34 |
| D321,715 S | 11/1991 | Beno et al. | D18/34 |
| 5,069,097 A | 12/1991 | Mori | 83/56 |
| D322,974 S | 1/1992 | Mori | |
| D348,271 S | 6/1994 | Mori | |
| 5,322,001 A | 6/1994 | Boda | 83/485 |
| D353,150 S | 12/1994 | Mori | |
| 5,463,922 A | 11/1995 | Mori | |
| D381,359 S | 7/1997 | Mori | |
| 5,671,647 A | 9/1997 | Mori | |
| 5,779,851 A * | 7/1998 | Ifkovits et al. | 156/505 |
| 5,802,942 A * | 9/1998 | Cornell et al. | 83/455 |
| 5,827,159 A | 10/1998 | Adachi | 483/29 |
| D415,519 S | 10/1999 | Mori | |
| 6,035,755 A | 3/2000 | Mori | |
| 6,223,639 B1 * | 5/2001 | Chen | 83/614 |
| 6,951,159 B2 * | 10/2005 | Lin et al. | 83/620 |

OTHER PUBLICATIONS

1991 Carl Office Supplies Catalog.

* cited by examiner

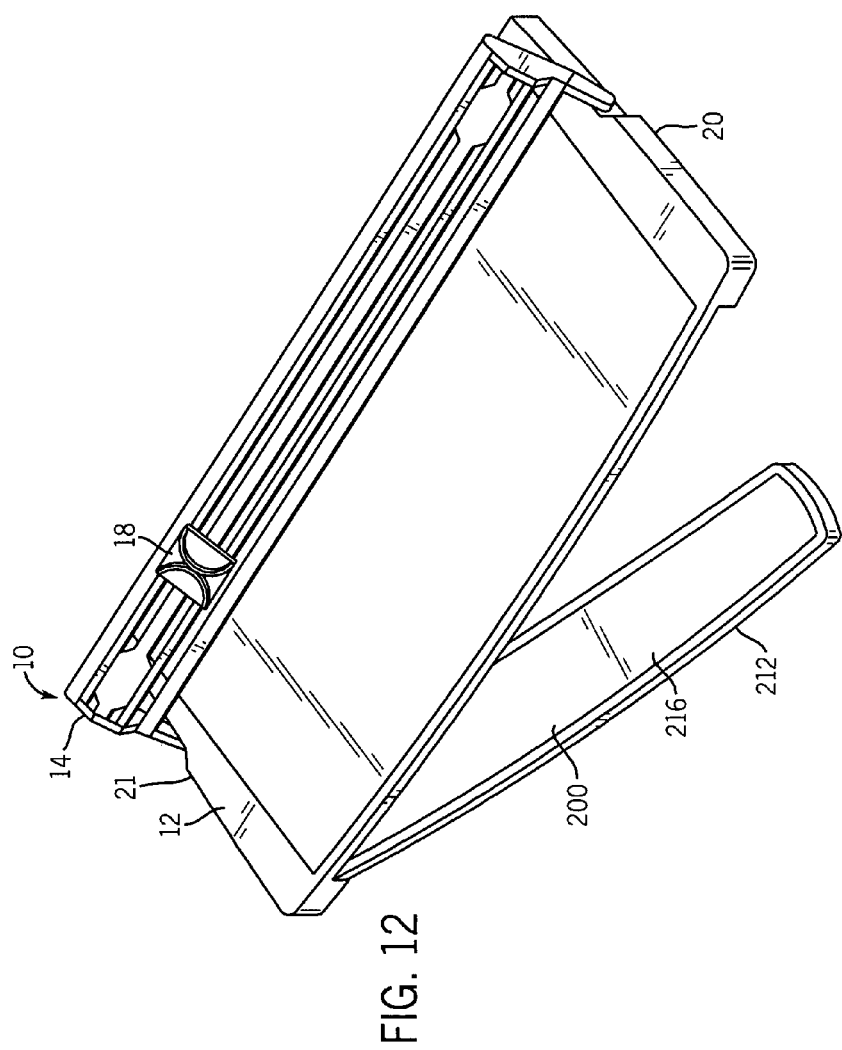

PAPER TRIMMER

FIELD OF THE INVENTION

The present invention is directed to paper trimmers. More particularly, the present invention is related to a paper trimmer including a mechanism for cutting materials along a substantially straight line.

BACKGROUND OF THE INVENTION

Devices for cutting or trimming sheet material utilizing different types of cutting blades are well known in the art. For example, early sheet cutting devices and mechanisms were found in industrial situations in which large rolls of sheet material needed to be cut. Different types of cutters or trimmers have been adapted for office or personal use.

Conventional paper cutters often include an elongated blade pivotally attached to a cutting board at one end. In these "guillotine-type" cutters, the elongated blade is lowered about the pivot, thereby cutting a paper or material by shearing action. The elongated blade is often exposed, posing a significant danger, especially for use by children. Another drawback of this type of cutter is the overall size which makes it difficult to easily and conveniently transport them for personal use.

One style of paper cutter includes a blade attached to a carrier which is translated along a rail assembly. The rail assembly may be pivoted at one end to permit loading and unloading of the material to be cut as disclosed in U.S. Pat. No. 5,069,097 entitled "PAPER-CUTTING MACHINE AND METHOD OF CUTTING PAPER" to Mori issued on Dec. 3, 1991. The rail assembly may also be pivoted at both end of the rail assembly as disclosed in U.S. Pat. No. 5,322,001 assigned to assignee of the present application and entitled "PAPER CUTTER WITH CIRCULAR BLADES" to Boda issued on Jun. 21, 1994. The rail may also be stationary as disclosed in U.S. Pat. No. 3,301,117 entitled "PAPER CUTTER" to Spaulding issued on Jan. 31, 1967. Attempts have also been made to combine a cutter with a ruler, while other cutting devices disclose a cutting member which is slidably guided within a slot in a ruler. The cutting member includes a rearward portion from which a blade is attached that is proximate the outside edge of the ruler.

Many of the cutters described above employ a spring to activate the blade. For example, several of the patents noted above include blades that are forced into engagement by pressing on the carrier and depressing a spring. The blade is disengaged by releasing the carrier and allowing the spring to force the blade away from the cutting board. These assemblies require a number of components to house the springs.

Another limitation of conventional cutters is the number of variables which may influence the straightness of the cut. Such cutters often employ a rail which would cut a straight line, but only if the rail was manufactured perfectly and actuated by the user with a consistent pressure in a straight down direction.

SUMMARY OF THE INVENTION

It is therefore an object of the invention to provide an improved paper trimmer that consistently cuts the paper in substantially straight lines.

It is another object of the invention to provide an improved paper trimmer that provides for a substantially straight cut even in the presence of varying forces applied to the blade carriage.

It is still another object of the invention to provide an improved paper trimmer that is relatively simple to assemble.

It is yet another object of the invention to provide an improved paper trimmer that is relatively simple to operate.

It is finally another object of the invention to provide an improved paper trimmer with an increased level of safety.

In accordance with the above objects and objects of the invention described hereinafter, the present invention provides for a material trimmer comprising a base having a support surface and a cutting region having a channel. A plate is movably attached to the base and includes oppositely facing upper and lower surfaces, an elongated slot therethrough, an elevated portion proximate each side of the slot, and a distal second end with the elevated portion leading to an arcuate surface. A carrier includes a top flange having a pair of oppositely extending sides and a foot extending from the top flange. The foot is slidably received within the slot, and a portion of the pair of oppositely extending sides are arcuate in shape and slidably received within the arcuate surface of the elevated portion. A blade is attached to the carrier, a portion of which extends below the lower surface of the plate within the channel when the plate is disposed over the cutting region. The slot has a first width at the first and second ends thereof and a second width between the first and second ends, the first width being larger than the second width. The larger widths of the slot permit the user to easily insert and remove the carrier from the paper cutter.

BRIEF DESCRIPTION OF THE DRAWINGS

The foregoing advantages and features of the invention will become apparent upon reference to the following detailed description and the accompanying drawings, of which:

FIG. 12 is an isometric view of a paper trimmer including a rotatable measuring portion according to an alternate embodiment of the invention;

DETAILED DESCRIPTION OF THE INVENTION

Figure 1:
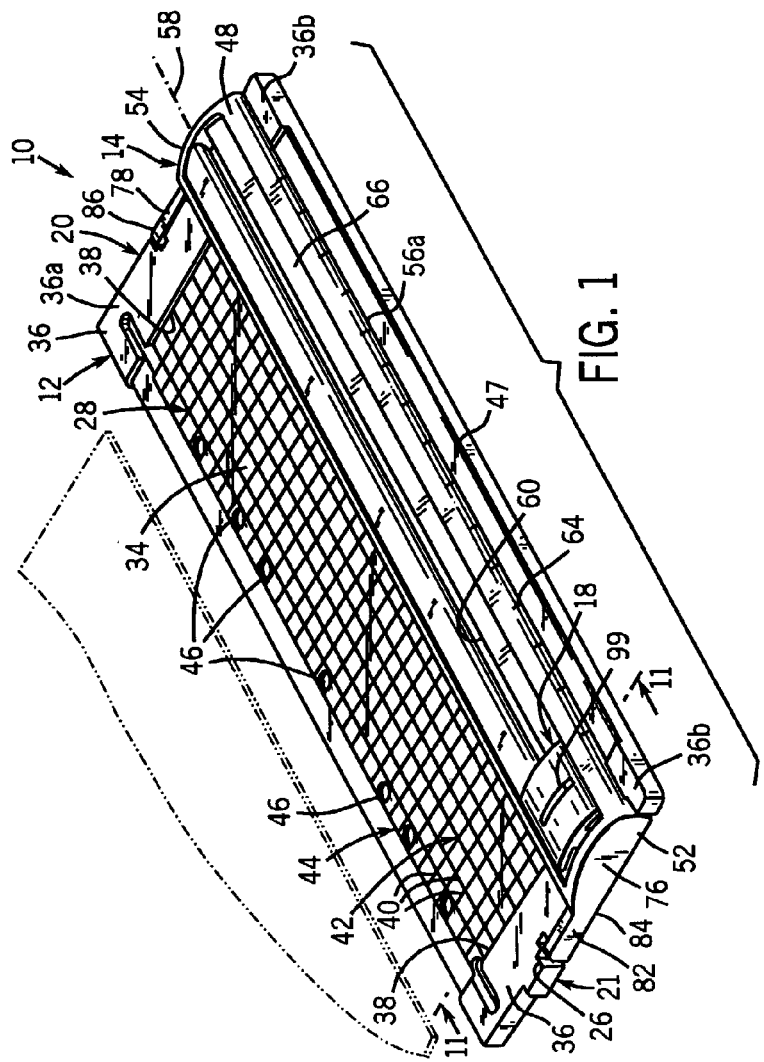
FIG. 1 is an isometric view of a paper trimmer with the plate in a lowered position.
Figure 2:
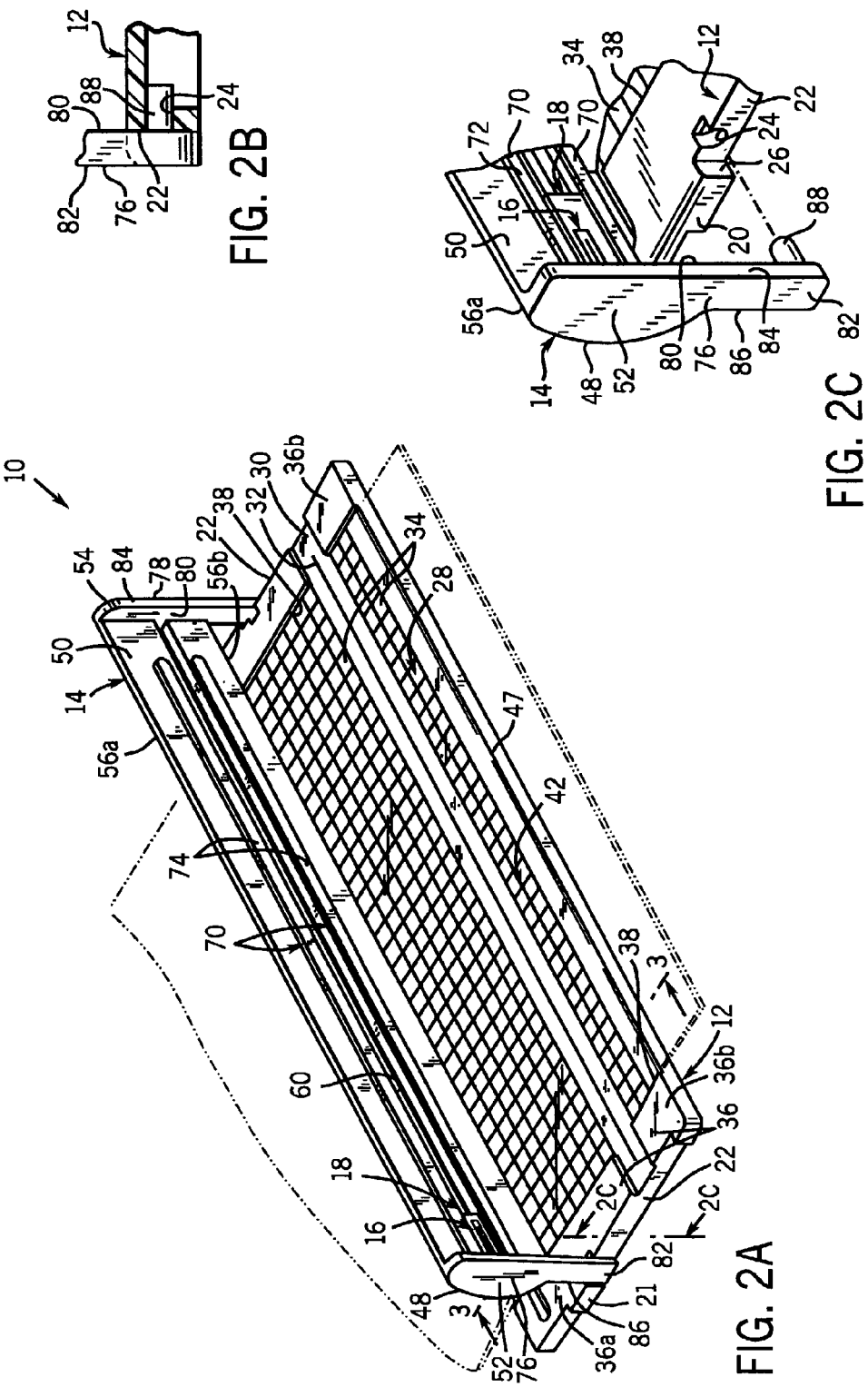
FIG. 2A is an isometric view of the paper trimmer with the plate in a raised position.
FIG. 2B is a fragmentary exploded view of the plate and base.
FIG. 2C is a fragmentary cross-sectional view taken generally along line 2C—2C of FIG. 2A.

A paper trimmer constructed in accordance with the present invention is shown generally at 10 in FIGS. 1–2. The paper trimmer 10 includes a base 12 and an elongated plate 14 pivotally attached to base 12. A blade assembly 16 is attached to a carrier 18. The carrier 18 is slidably attached to the elongated plate 14.

Figure 3:
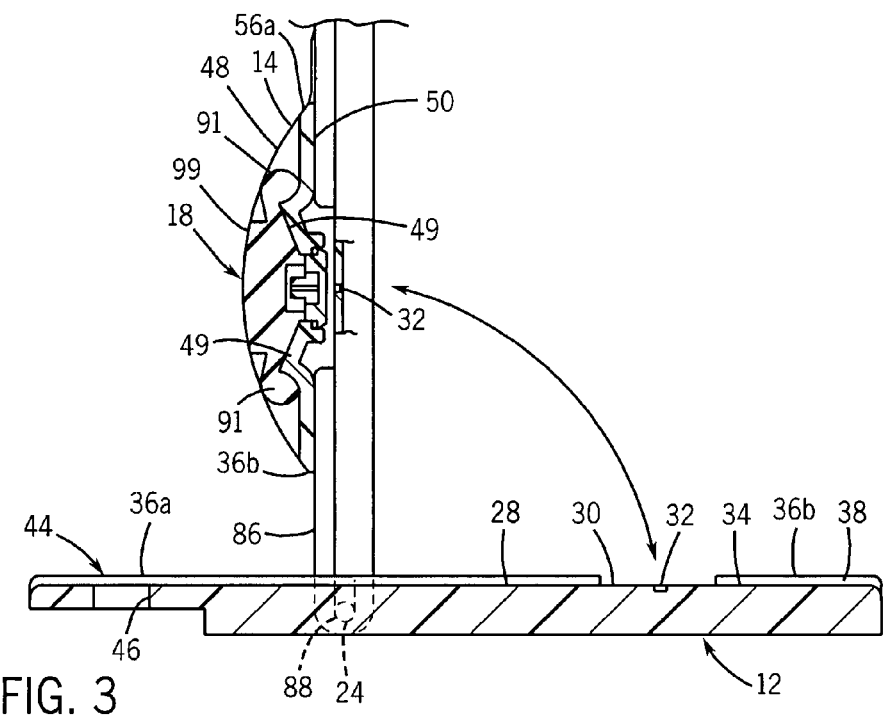
FIG. 3 is a cross-sectional view taken generally along line 3—3 of FIG. 2A.

As shown in FIGS. 1–3 the base 12 includes a first side 20 and a second side 21, the first side 20 and the second side 21 each include a recess 22 having an aperture 24. Each recess 22 has a wall 26 near the aperture 24.

The base 12 also includes a top surface 28 having a cutting region 30 provided with a channel 32 extending substantially the entire distance between the first side 20 and the second side 21. The top surface 28 also includes a support surface 34. A pair of raised guides 36 are integrally formed with top surface 28 and are located near the first side 20 and the second side 21. Each raised guide 36 includes a guide wall 38 normal to the top surface 28. Each raised guide 36 also includes a first guide portion 36a on one side of channel 32 and a second guide portion 36b on the other side of the channel 32.

In a preferred embodiment of the invention and as shown in FIGS. 1–2, the top surface 28 also includes a plurality of grooves 40 forming a grid 42. However, there are no physical grooves 40 in the vicinity of the channel 32 in the cutting region 30. In an alternative embodiment of the invention, however, the grid 42 may take the form of printing lines instead of employing the grooves 40. It is also possible to eliminate the grid 42 and the grooves 40 entirely. The top surface 28 may include one or more metric or English rulers formed in grooves or printed thereon. These rulers may aid the user in measuring and/or aligning the materials to be cut.

The base 12 also includes an attachment edge 44 substantially normal to the first side 20 and the second side 21. The attachment edge 44 includes a plurality of apertures 46 to permit attachment to a standard ring binder (not shown). Additionally, an alignment edge 47 is located substantially parallel to and distal from the attachment edge 46.

Figure 4:
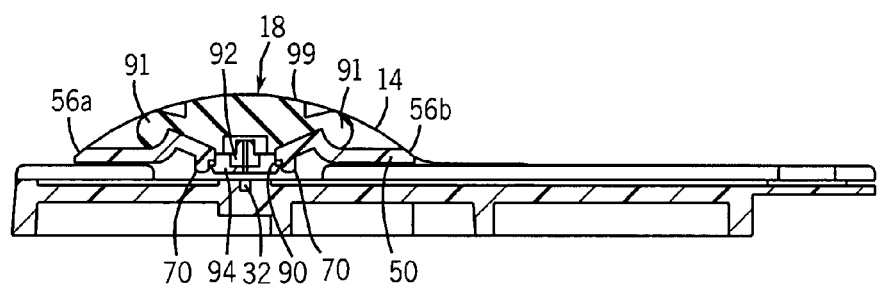
FIG. 4 is a cross-sectional view taken generally along line 4—4 of FIG. 1.

As shown in FIGS. 1–4, the elongated plate 14 includes an upper surface 48, an oppositely facing lower surface 50, a first end 52, a second end 54 (see FIG. 1), and first and second edges 56a, 56b parallel to a longitudinal axis 58 of the elongated plate 14. As shown in FIGS. 1–3, the elongated plate 14 also includes a slot 60 extending through the elongated plate 14 along longitudinal axis 58. The slot 60 includes a pair of slot walls 62 and extends intermediate the first end 52 and second end 54. As shown in FIGS. 3–4, the upper surface 48 includes an angled and elevated portion 49 on each side of the slot 60, with the elevation of the angled and elevated portion 49 increasing away from the slot 60. The angled and elevated portion 49 terminates at the maximum elevation with an arcuate portion 51 before proceeding to the first and second edges 56a and 56b. However, the upper surface 48 may have other shapes as well such as a planar shape before the arcuate portion 51.

In one embodiment of the invention, a scale 64 is printed on the upper surface 48 proximate the first and second edges 56a, 56b. Alternatively, the scale 64 may be etched into or otherwise formed integrally with the upper surface 48. The elongated plate 14 further includes a top recess 66 proximate both sides of slot 60.

The lower surface 50 includes a bottom recess 68 in the vicinity of the slot 60 (see FIG. 3). As shown further in FIGS. 3–5 and 11, the bottom recess 68 forms a track substantially parallel to the slot walls 62. The lower surface 50 includes a pair of ribs 70 extending substantially parallel to the longitudinal axis 58, with the ribs 70 being located proximate a side of the bottom recess 68. Each of the ribs 70 includes a rib surface 72 raised from the lower surface 50. Each of the ribs 70 also includes a pair of rib ends 74.

The elongated plate 14 also includes a first arm 76 attached to the first end 52 and a second arm 78 attached to the second end 54 (see FIG. 2A). In a preferred embodiment of the invention, the first and second arms 76, 78 are integrally formed with the first and second ends 52, 54 respectively. The first and second arms 76, 78 each extend downward from the lower surface 50 and beyond the first edge 56a in a direction substantially normal to the longitudinal axis 58. The first and second arms 76, 78 each include an inner side 80, an outer side 82, a bottom edge 84 and a top edge 86. The first and second arms 76, 78 also include a post 88, shown in FIG. 2A, extending from the inner side 80.

In one embodiment of the invention, the elongated plate 14 is formed from a resilient material, such as plastic. The resilient material permits the first and second arms 76, 78 to be conveniently forced apart such that the first and second arms 76, 78 spring back to their original position when released.

Figure 15:
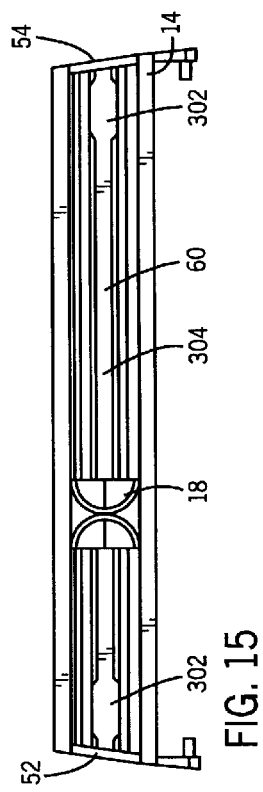
FIG. 15 is a top view of the elongated plate of the paper trimmer of FIG. 12.

As shown in FIG. 15, the slot 60 is of a nonuniform width. In the embodiment shown, the slot 60 has a first width 302 adjacent both the first end 52 and the second end 54, and a second width 304 in the portion of the slot 60 that is between the first end 52 and the second end 54.

As shown in FIGS. 3–5 and 15, the carrier 18 includes a foot 90 having a width less than that of the slot 60 at both the first width 302 and the second width 304. The carrier 18 also includes a blind cavity 92 formed in the foot 90 and extending from a foot bottom 94. In a preferred embodiment of the invention, the carrier 18 is also provided with a handle 99 (see FIG. 11). The carrier 18 is sized relative to the slot 60 such that the carrier can be positioned in the elongated plate 14 through the first width 302 of the slot, but can neither be directly positioned nor directly removed from the slot 60 to or from the second width 304. The second width 304 is sized to form a snug relationship with the carrier 18. In one preferred embodiment of the invention, the first width 302 has a width of about 0.320 inches, while the second width 304 has a width of about 0.260 inches. In this particular embodiment of the invention, there is a 0.005 inch clearance between the carrier 18 and the elongated plate 14.

Figure 5:
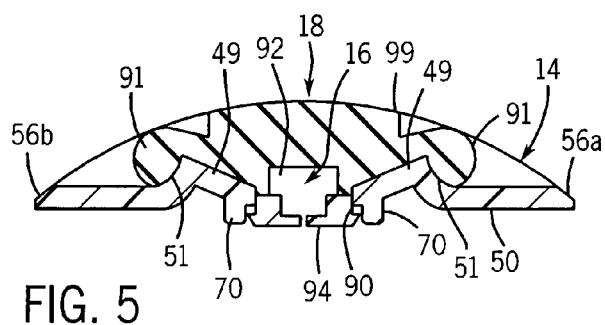
FIG. 5 is an enlarged fragmentary cross-sectional view of FIG. 4.
Figure 16:
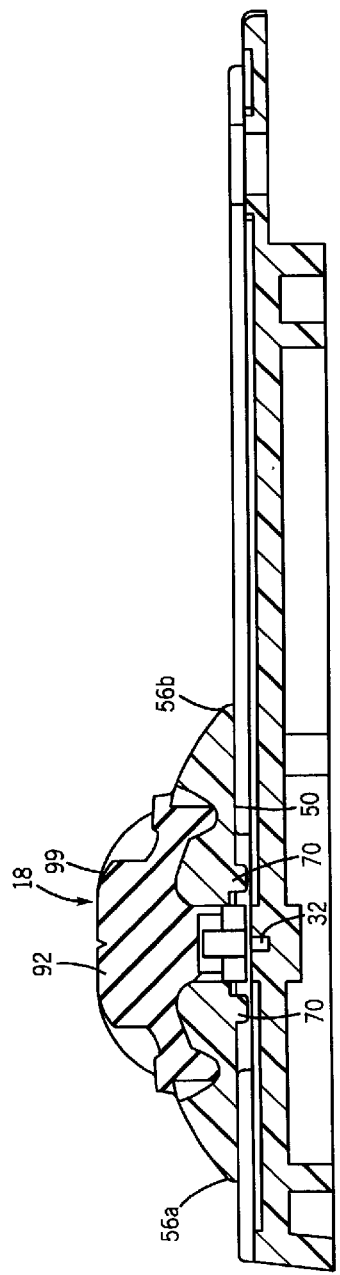
FIG. 16 is a cross-sectional view of a paper trimmer plate according to an alternate embodiment of the invention.

As shown in FIG. 5, the carrier 18 also includes a cylindrical portion 91 at each end thereof The cylindrical portion 91 is sized and position to engage the arcuate portions 51 of the elongated plate 14. In a preferred embodiment of the invention, the centers of the two cylindrical portions 91 are about 0.797 inches away from each other and are positioned to correspond to the center of the radius of curvature of each of the arcuate portions 51 of the elongated plate. This correspondence permits the carrier 18 to glide along the elongated plate 14 in a substantially straight line. Because of the positioning and alignment of the cylindrical portions 91 to the arcuate portions 51, the carrier 18 is greatly hindered from lateral movement perpendicular to the slot 60, substantially regardless of the amount and degree of force imparted onto the carrier 18. An alternate embodiment of the elongated plate 14 is shown in FIG. 16.

Figure 6:
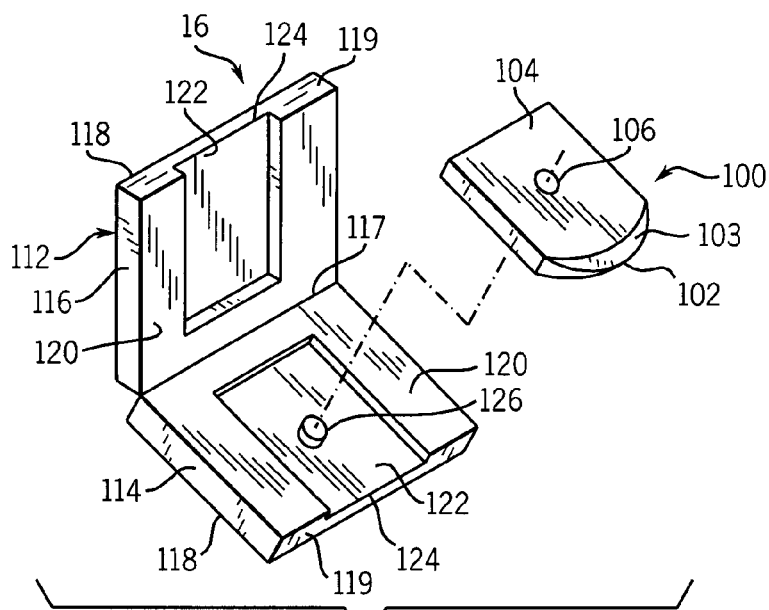
FIG. 6 is an exploded view of the blade assembly shown in the raised position.
Figure 7:
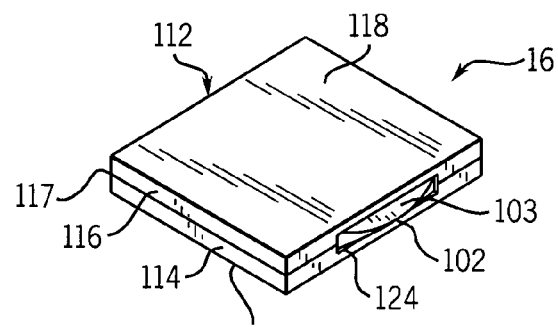
FIG. 7 is an isometric view of the blade assembly shown in the lowered position.

As shown in FIGS. 6–7, the blade assembly 16 includes a blade 100 having a cutting edge 102 and a main portion 104 provided with an aperture 106. In a preferred embodiment of the invention, the cutting edge 102 has an arcuate shape. However other well known configurations may be used. For example, the cutting edge 102 may be V-shaped with an apex 108 and a first and second cutting portion 110 diverging from the apex 108 (See FIG. 10). In this alternative embodiment, the angle formed by cutting portions 110 is approximately 45 degrees, although other angles are possible.

The blade assembly 16 also includes a blade holder 112 having a first portion 114, a second portion 116, and an integrally formed hinge 117 connecting the first and second potions 114, 116. The first and second portions 114, 116 each include an outer surface 118, an inner surface 120 and an holder edge 119 opposite the hinge 117. Each of the first and second portions 114, 116 include a depression 122 configured to receive a blade 100. The depression 122 includes an opening 124 at the holder edge 119. A stud 126 projecting from the depression 122 is integrally formed with the first portion 114. Alternatively, the stud 126 may be integrally formed with the second portion 116.

Figure 9:
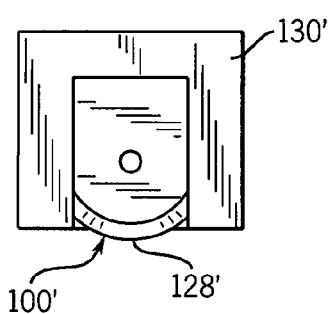
FIG. 9 is a top view of a blade assembly of an alternative embodiment.
Figure 10:
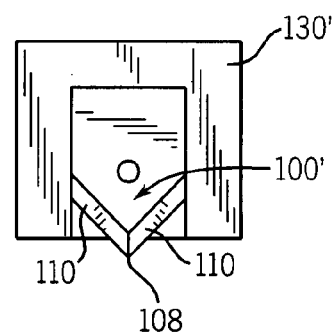
FIG. 10 is another top view of a blade assembly of another alternative embodiment.
Figure 8:
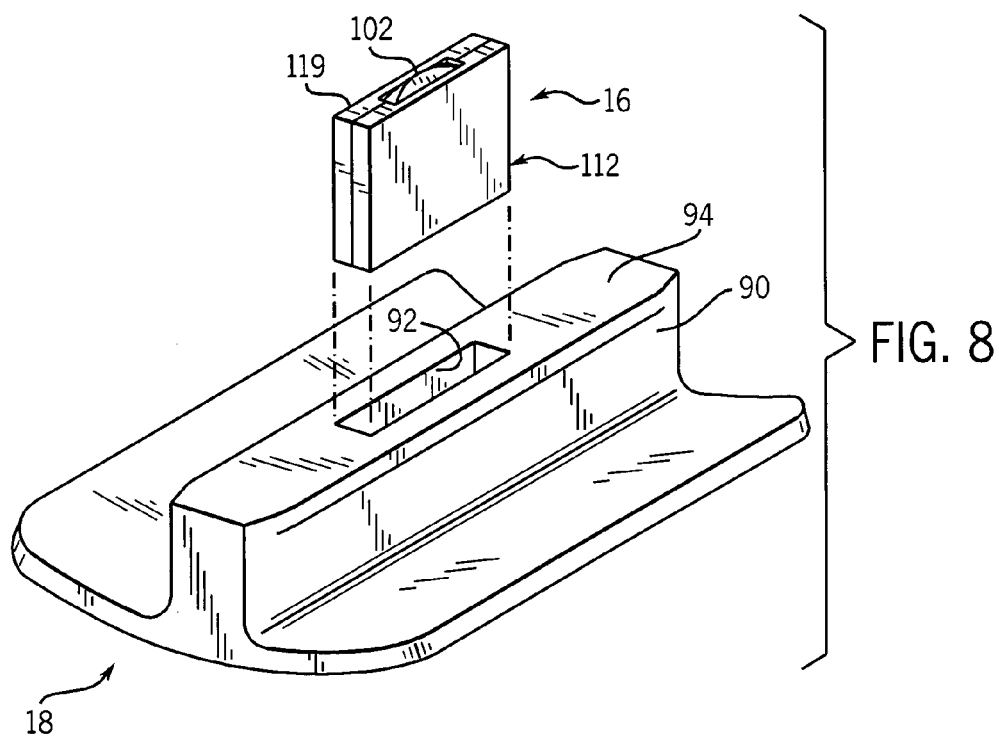
FIG. 8 is an exploded view of the carrier and blade assembly.
Figure 11:
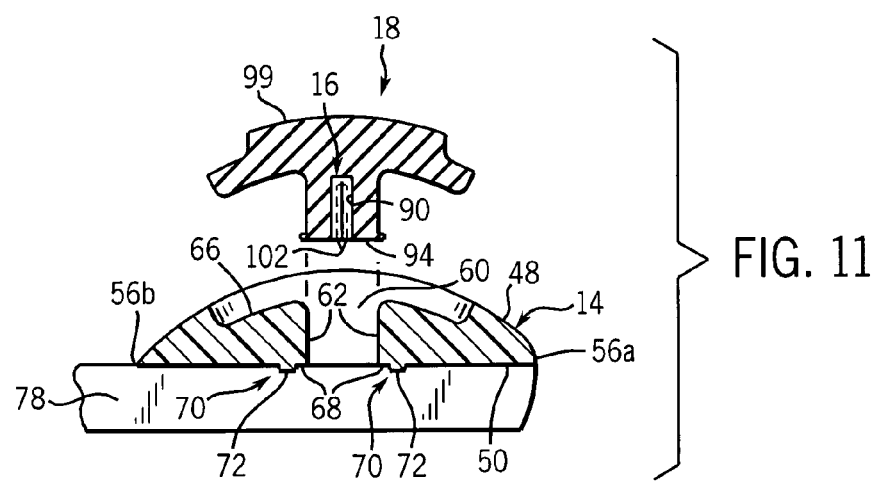
FIG. 11 is an exploded cross sectional view of the carrier and plate in the lowered position taken generally along line 11—11 of FIG. 1.

In an alternative embodiment of the invention, a recess is located within the depression 122 of the second portion 116 to positively receive the stud 126. In another alternative embodiment and as shown in FIGS. 9–10 a blade 100' is spot welded to a metal member 130' such that a portion of a cutting edge 128' extends beyond a bottom edge of the metal member 130'.

The assembly and operation of the paper trimmer 10 is generally as follows. The elongated plate 14 is pivotally attached to the base 12 by forcing the arms 76, 78 apart such that the posts 88 are received within the apertures 24. The elongated plate 14 is pivotally attached to the base 12. As illustrated in FIGS. 1–2, the base 12 has a length along the longitudinal axis 58 substantially equal to the length of the elongated plate 14. Additionally, the base 12 has a width (normal to the longitudinal axis 58) greater than that of the elongated plate 14 such that the support surface 34 extends beyond the edges 56a, 56b. This aids in the stability and operation of the paper trimmer 10.

In the lowered or closed position, and as shown in FIG. 1, the upper surface 48 of the elongated plate 14 is facing away from the base 12. Similarly, the rib surface 72 of the ribs 70 is in contact with the top surface 28 of the base 12. Additionally, in the lowered position the outer sides 82, 84 of each of the arms 76, 78 are substantially flush with the first side 20 and the second side 21 of the base 12. The elongated plate 14 is free to pivot from a lowered position. From the lowered position, the top edge 86 of the arms 76, 78 are substantially flush with the top surface 28 of the base 12, shown in FIG. 2, to a raised or open position. In the raised position, the top edge 86 of each of the arms 76, 78 are substantially normal to the top surface 28, as shown in FIG. 3. In the fully raised position, the top side 86 of the arms 76, 78 are supported by the walls 26, allowing the elongated plate 14 to remain substantially normal to the top surface 28. The extension of the ribs 70 from the lower surface 50 aids to shield the blade 100 from a user when the elongated plate 14 is in the raised position.

The blade 100 is attached to the blade holder 112 by positioning the blade aperture 106 over the stud 126 such that the blade cutting edge 102 extends beyond the opening 124. The main portion 104 of the blade 100 is positively located within the depression 122. The second portion 116 is folded about the hinge 117 such that the inner surfaces 120 are in contact. This feature is shown in FIGS. 6–7.

The blade assembly 16 is slidably attached within the cavity 92 of the carrier 18. In a preferred embodiment of the invention, the blade holder 112 is press fit within the cavity 92 such that the holder edge 119 is substantially flush with the foot bottom 94, and a portion 103 of the cutting edge 102 extends beyond the opening 124. Preferably, the holder edge 119 protrudes no more than about 0.005 inches from the foot bottom 94. In a preferred embodiment, the cutting edge 102 extends approximately 0.015 inches below the foot bottom 94 of the carrier 18. However, the cutting edge 102 may extend a greater or lesser distance below the foot 94 as well.

In a most preferred embodiment of the invention, the included angle of the cutting edge 102 is between about 30 and 40 degrees. The elongated plate 14 is preferably formed of a resilient material, aiding a portion of the carrier 18 to be placed through the slot 60. The carrier 18 is slidably received within the slot 60.

The paper trimmer 10 may be stored in a ring binder (not shown) by attaching the rings to the apertures 46. The paper trimmer 10 may be used either while attached to the ring binder or removed from the ring binder. To cut paper or similar material, a user first pivots the elongated plate 14 to the raised position as described above. The paper or like material to be cut is then placed on the support surface 28 of the base 12 such that the region where a cut is to be made overlies the channel 32. The elongated plate 14 with the carrier 18 situated in a position proximate one of the ends 52, 54 of the elongated plate 14 is then pivoted into the lowered position. In the lowered position, the rib surface 72 of the ribs 70 are resting on the paper to be cut. To cut the material, the user slides the carrier 18 along the longitudinal axis 58 such that portion of the cutting edge 103 travels within the channel 32 as it traverses across the material. The symmetric nature of the cutting edge 102 permits translation and cutting of the material in either direction along the longitudinal axis 58. The absence of grooves 40 in cutting region 30 aids in the smooth translation of the carrier 18 over the cutting region 30 during cutting of the material as the cylindrical portions 91 travel along the arcuate portions 51.

In an alternate embodiment of the invention, the elongated plate 14 may be hingedly connected to the base 12. Alternatively, the elongated plate 14 may be connected at one end only such that the longitudinal axis 58 is substantially normal to the base 12 when the elongated plate 14 is in the raised position. Also, the posts 88 may be formed on the base 12, and the apertures 24 may be formed on the arms 76, 78. Also, the carrier 18 may have a groove intermediate the upper and lower surfaces 48, 50 which receives a flange extending from the foot 90. Further, the blade 100 may be located within the holder 112 by a combination of notches in the blade 100 and matching protrusions in the holder 112.

Figure 14:
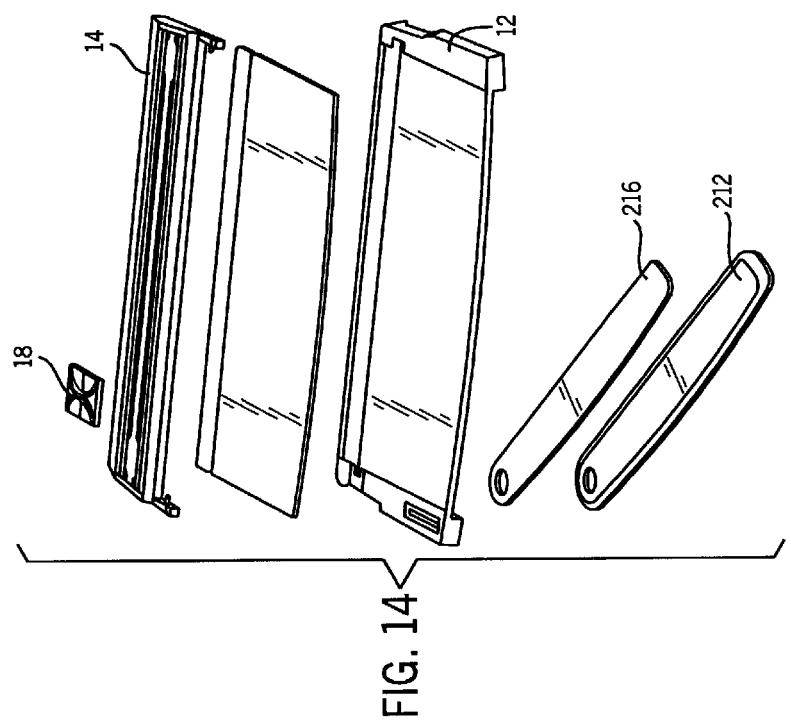
FIG. 14 is an exploded view of the paper trimmer of FIG. 12.
Figure 13:
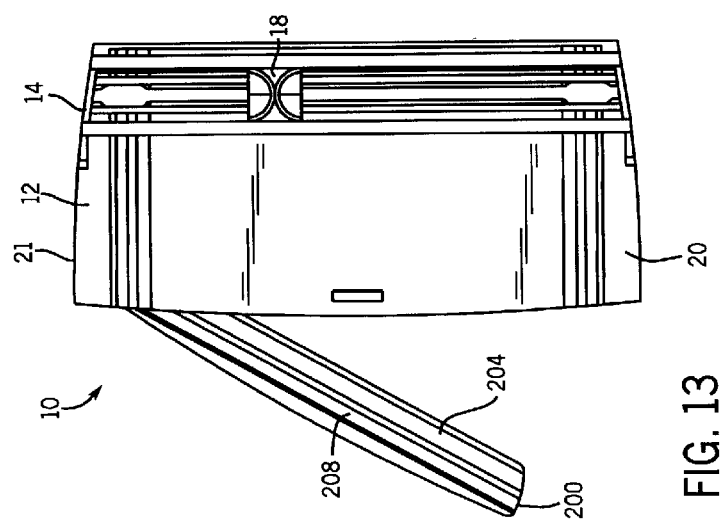
FIG. 13 is a top view of the paper trimmer of FIG. 12.

In an alternate embodiment of the invention and as shown in FIGS. 12–14, the paper trimmer 10 includes a rotatable portion 200 coupled to the base 12 in the vicinity of the attachment edge 44. The rotatable portion 200 is capable of rotation about an axis substantially perpendicular to the longitudinal axis about which the elongated plate 14 rotates. The rotatable portion 200 may include features such as an English ruler 204 or a metric ruler 208 for measurement purposes, and could also be used to properly and accurately align the material to be cut. In one embodiment of the invention, the rotatable portion 200 comprises a plastic base 212 fixedly attached to a hard surface 216 formed from a metal, although other types of materials may be used.

It should be understood that the above description of the invention and specific examples and embodiments, while indicating the preferred embodiments of the present invention are given by demonstration and not limitation. For example, the dimensions and clearances for the various components of the elongated plate 14, the carrier 18 and the slot 60 may be varied depending upon the particular manufacturing and design requirements, and the types of materials used for the individual components may also vary. Many changes and modifications within the scope of the present invention may therefore be made without departing from the spirit of the invention, and the present invention includes all such changes and modifications.

What is claimed is:

1. A paper trimmer, comprising:
   a base including a support surface and a cutting region having a channel;
   a plate pivotally attached to the base and including an upper surface, a lower surface, a first end, a second end, and a slot extending through the plate along a longitudinal axis of the plate intermediate the first and second ends, the slot having a first width at a first portion thereof and a second width at a second portion thereof, the first width being larger than the second width;
   a carrier being slidably received in the slot and sized to be removed from the slot in a direction away from the lower surface when positioned adjacent the first width of the slot and impeded from being removed in a direction away from the lower surface when positioned adjacent the second width of the slot, the carrier including a first cylindrical portion and second cylindrical portion on opposite sides of the slot;
   the plate including an arcuate portion on each side of the slot corresponding to the cylindrical portions of the carrier such that the carrier travels along the plate via the interaction of the cylindrical portions with the arcuate portions; and
   a blade attached to the carrier, wherein a portion of the blade extends below the lower surface of the plate within the channel when the plate is disposed over the cutting region.

2. The paper trimmer of claim 1, wherein the carrier includes a top flange having a width greater than that of the slot and a bottom flange having a width greater than that of the slot.

3. The paper trimmer of claim 2, wherein the slot includes the first width at the first end of the plate.

4. The paper trimmer of claim 2, wherein the slot includes the first width at the first and second ends of the plate, and wherein the slot has the second width between the first end and the second end of the plate.

5. The paper trimmer of claim 1, wherein the plate comprises a resilient material.

6. The paper trimmer of claim 5 wherein the lower surface includes a recessed track formed proximate the slot for receiving a bottom flange of the carrier.

7. The paper trimmer of claim 6, wherein the lower surface includes a pair of ribs proximate the recessed track.

8. The paper trimmer of claim 1, wherein the base includes an attachment edge having a plurality of aperture configured for attachment to a ring binder.

9. The paper trimmer of claim 1, wherein the support surface includes a raised guide proximate one of the sides to align the paper or material to be cut.

10. The paper trimmer of claim 1, further comprising: a blade assembly including a blade holder having a first portion and a second portion hingedly connected to the first portion, the blade holder including locating means for positively locating the blade within the first and second portions, the carrier including a cavity to slidably receive the blade assembly.

11. The paper trimmer of claim 10, wherein the locating means includes a stud attached to one of the first portion and the second portion of the blade holder, the blade includes a cutting edge and a foot having an aperture sized to receive the stud.

12. The paper trimmer of claim 11, wherein the blade cutting edge is arcuate.

13. The paper trimmer of claim 11, wherein the blade cutting edge has an apex formed at the juncture of a first cutting portion and a second cutting portion diverging away from one another thereby permitting the user to cut paper by movement of the carrier in either direction along the longitudinal axis.

14. The paper trimmer of claim 1, further comprising a measuring instrument rotatably coupled to the base.

15. A material trimmer comprising:
   a base having a support surface and a cutting region having a channel;
   a plate movably attached to the base and including:
     oppositely facing upper and lower surfaces,
     an elongated slot therethrough,
     an elevated portion proximate each side of the slot and angularly defined away from the slot, the elevated portion leading to an arcuate surface, and
     a distal second end;
   a carrier including a top flange having a pair of oppositely extending sides, a foot extending from the top flange, the foot being slidably received within the slot, and a portion of the pair of oppositely extending sides being arcuate in shape and slidably received within the arcuate surface of the elevated portion, the portion of the pair of oppositely extending sides being substantially cylindrical in shape; and
   a blade attached to the carrier, a portion of the blade extending below the lower surface of the plate within the channel when the plate is disposed over the cutting region,
   wherein the slot has differing minimum and maximum widths, and wherein the foot is capable of being removed from the slot when the carrier is positioned adjacent the maximum width of the slot, and wherein the foot is substantially incapable of being removed from the slot when the carrier is positioned adjacent the minimum width of the slot.

16. The material trimmer of claim 15, wherein the slot has the minimum width at the substantially opposite ends of the plate, and wherein the slot has the maximum width between the substantially opposite ends of the plate.

17. The material trimmer of claim 15, further comprising a rotatable member coupled to the base.

18. The material trimmer of claim 17, wherein the plate is formed from a resilient material.

* * * * *